US009509394B1

(12) United States Patent
Mitchell et al.

(10) Patent No.: US 9,509,394 B1
(45) Date of Patent: Nov. 29, 2016

(54) ADVANCE MOBILE COMMUNICATIONS GATEWAY WITH SATCOM BACKHAUL ACCESS AND A MODULARIZED DATA SECURITY SYSTEM AND METHOD FOR DATA AND SECURE KEY DISTRIBUTION TO AIRCRAFT

(71) Applicant: ROCKWELL COLLINS, INC., Cedar Rapids, IA (US)

(72) Inventors: James P. Mitchell, Cedar Rapids, IA (US); Mark Bortz, Robins, IA (US); Robert L. Lentz, Severna Park, MD (US); Scott J. Zogg, Cedar Rapids, IA (US); Fraser R. Chisholm, Lantau Island (HK); Kevin Delaney, Annapolis, MD (US); Diane McClatchy, Annapolis, MD (US); Rolf R. Stefani, West River, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/876,896

(22) Filed: Oct. 7, 2015

(51) Int. Cl.
| | | |
|---|---|---|
| *H04B 7/00* | (2006.01) | |
| *H04B 7/185* | (2006.01) | |
| *H04W 4/04* | (2009.01) | |
| *H04W 28/16* | (2009.01) | |
| *H04W 12/02* | (2009.01) | |

(52) U.S. Cl.
CPC ......... *H04B 7/18506* (2013.01); *H04W 4/046* (2013.01); *H04W 12/02* (2013.01); *H04W 28/16* (2013.01)

(58) Field of Classification Search
CPC H04B 7/18506; H04W 4/046; H04W 28/16; H04W 12/02

USPC .................. 455/41.2, 552.1, 553.1, 557, 420
See application file for complete search history.

(56) References Cited

U.S. PATENT DOCUMENTS

| 7,949,301 | B2 * | 5/2011 | Bells | H04W 4/00 455/41.2 |
|---|---|---|---|---|
| 7,971,227 | B1 * | 6/2011 | Marko | H04H 20/426 370/394 |
| 2002/0059614 | A1 * | 5/2002 | Lipsanen | H04N 7/163 725/75 |
| 2004/0008253 | A1 * | 1/2004 | Monroe | G08B 13/19641 348/143 |
| 2004/0092263 | A1 * | 5/2004 | Parkman | H04B 7/18508 455/436 |
| 2009/0016249 | A1 * | 1/2009 | Li | H04J 3/0638 370/310.1 |
| 2009/0092074 | A1 * | 4/2009 | Jamalipour | H04B 7/18506 370/316 |
| 2013/0265425 | A1 * | 10/2013 | Smailus | G01C 23/00 348/148 |
| 2014/0065954 | A1 * | 3/2014 | Ovens | G08G 5/0021 455/41.1 |

(Continued)

*Primary Examiner* — Dominic Rego
(74) *Attorney, Agent, or Firm* — Ronald E. Prass, Jr.; Prass LLP

(57) ABSTRACT

A system and method are provided for implementing a security construct for downloading, delivering and protecting large amounts of data for transfer to an aircraft upload capability in a short period of time, including between individual legs of a flight for a particular aircraft or fleet of aircraft. Large data packages include In Flight Entertainment and Electronic Flight Bag data. The data is downloaded at an available rate using wired communication paths communicating with various data sources via communication networks to a mobile communication device. The data is secured in the mobile communication device according to particular encryption schemes acceptable to data content providers. The mobile communication device securely holds the data for carriage to the aircraft where wired communication is established to upload the data in available abbreviated amounts of time in a manner that is not dependent on the availability of wireless communicating bandwidth.

18 Claims, 4 Drawing Sheets

(56) References Cited

U.S. PATENT DOCUMENTS

| | | | | |
|---|---|---|---|---|
| 2014/0074326 A1* | 3/2014 | Pereira | ................... | G01W 1/00 701/14 |
| 2014/0254693 A1* | 9/2014 | Mitchell | ................... | H04B 3/54 375/257 |
| 2014/0282470 A1* | 9/2014 | Buga | ................... | G06F 8/65 717/170 |

* cited by examiner

ADVANCE MOBILE COMMUNICATIONS GATEWAY WITH SATCOM BACKHAUL ACCESS AND A MODULARIZED DATA SECURITY SYSTEM AND METHOD FOR DATA AND SECURE KEY DISTRIBUTION TO AIRCRAFT

BACKGROUND

1. Field of the Disclosed Embodiments

This disclosure relates to systems and methods for configuring a particularized portable data transfer device in a form of a Mobile Communication Gateway Unit (MCGU) to provide broad spectrum data acquisition worldwide, including through satellite communication backhauls, and data warehousing that is not data rate transfer, or otherwise available bandwidth, constrained for on-call data upload to fleets of vehicles, including aircraft.

2. Related Art

Modern aircraft host extensive suites of external communication interfaces to support differing levels of voice and data exchange (1) when airborne, (2) when on the ground taxiing to and from terminal locations, and (3) when parked at particular terminal locations (including maintenance hangars/stations). Among the broad spectrum of wireless data communications services available to modern aircraft are HF, VHF, and various satellite communication links including, but not limited to, satellite communication links supported by OneWeb® Ltd., Iridium® Communications, Inc. or Inmarsat® PLC.

With a proliferation in a need for accommodating passenger wireless communications in a competitive travel market, certain systems have been adapted to provide wireless data communication links for passenger comfort, connectivity and entertainment. In instances, separate communication systems, communication control systems and communication system components have been added to the extensive suites of external and internal communication interfaces and routers available on a particular aircraft.

Schemes to support broad capability coverage for passenger direct communication often adapt the increasingly ubiquitous nature of wireless access points, which may be operating, for example, according to Wi-Fi communication protocols and/or standards, to facilitate short range high volume communication between aircraft communication components and data services available at, or accessible through, terminal locations/installations. Communications are facilitated through a mix of fixed (ground) wireless RF solutions, including, but not limited to domestic and international cellular, Wi-Fi, WiMAX, potentially WiGIG, and other like communication links, which may be varyingly made available for voice and/or data communication between a fixed location, including an aircraft passenger or maintenance terminal, and an aircraft parked in a particular location with respect to the aircraft passenger or maintenance terminal.

Regardless of the multiplicity of fixed and/or mobile communication nodes with which a particular aircraft, even one parked at a terminal, may be able to link for facilitating all types of communications, there are certain real-world constraints that limit an ability to meet all of the expanding voice and data communication requirements that are presented in particular scenarios in real time. Satellite time is comparatively expensive. While fixed ground locations tend to be available in large enough numbers to act as gap fillers, and are comparatively cheaper to operate for data flow and data exchange, all of the respective wireless fixed voice and/or data communication links tend to be limited (according to frequency, propagation and other like limits) in their capacity to transmit bulk data to and from aircraft. Available bandwidth is often a limiting constraint in prioritizing which of any number of particular communication requirements are fulfilled at any given time. Further, it is well understood to those of skill in the art that a particular proportion of available fixed sites, for example, on an aircraft passenger terminal, may be physically blocked by line of sight constraints, as well as being unreachable due to overall power output restrictions that may be mandated for communication deconfliction and interference mitigation, among other objectives.

Secure transfer of information to vehicles, particularly the transfer of large files of bulk data including but not limited to streamed video, is often constrained. The constraints may include the maximum available data rate of the transfer to servers within the vehicles. The constraints may further include the competition that arises in dedicating uninterrupted communications to the conduct of such a transfer to the exclusion or near exclusion of all other potentially interfering communication requirements. The data rate transfer difficulties are often exacerbated by the need to encrypt bulk data, such as may be required for the secure transfer of In-Flight Entertainment (IFE) data files or Electronic Flight Bag (EFB) date files. These types of files may be considered proprietary to various content providers who do not want their bulk data files to be pirated in the process of providing the content to vehicle (aircraft) operators for upload in the vehicles (aircraft) they operate.

Based on the above constraints, it is not enough to have bulk data available at, for example, an aircraft terminal ready for transmission to the aircraft. Rather, particular placement of the aircraft and uninterrupted communications over a comparatively lengthy time frame may be necessary to effect the transmission of the bulk data to the aircraft. Conversely, a window to effect such bulk data transfer may be strictly limited by a need to promote other passenger, aircrew and other communication needs even while turning an aircraft around at the terminal between inflight legs.

SUMMARY OF THE DISCLOSED SUBJECT MATTER

It would be advantageous to provide systems and methods that are not constrained, in real time, by available bandwidth, or other data transmission constraints, to facilitate the upload of bulk data to an aircraft in a potentially limited timeframe between, for example, legs of flight for the aircraft.

Exemplary embodiments of the systems and methods according to this disclosure may provide a physical data transmission interface unit that is loadable with available bulk data content according to available bandwidth over an extended period of time.

Exemplary embodiments may provide a physical data transmission interface unit in a form of a portable self-contained/self-powered data storage component that may be transportable to a vehicle, including an aircraft, for connected (wired) communication to facilitate upload of bulk data to vehicle (aircraft) systems that may be facilitated in a limited availability access window for the vehicle (aircraft).

Exemplary embodiments may provide particular directed wireless communications over a specified short-range wireless data communication link between a physical data transmission interface unit and a vehicle (aircraft). A secure high-speed, interference free communication link may be established with a capacity to handle upload of secured (or encrypted) bulk data (including IFE and EFB information or data files) to aircraft systems in a limited availability time window for the vehicle (aircraft). As one example, emerging WiGIG data communication interfaces may facilitate the ability, at particularly close line of sight ranges, to the aircraft, to facilitate the upload without involving standard frequency deconfliction concerns that exist among other wireless data communication interfaces.

Exemplary embodiments may provide in, or associated with, a physical data transmission interface unit, a data security unit or capability in order that the unit (1) may accept encrypted data to be decrypted for use and/or (2) may store bulk data in a secure (encrypted, ciphered or other) form that is acceptable to the content providers.

Exemplary embodiments may provide a docking station for "parking" one or more physical data transmission interface units for bulk data upload from multiple available sources. The docking station may include a selective capability to implement communication links between the docking station, one or more of the multiple physical data transmission interface units, and the multiple available sources. Such data communication interfaces may be selected according to availability, cost, and other parameters based on a time frame agnostic scheme for the upload of the bulk data to the physical data transmission interface units, which may be comparatively unconstrained.

Exemplary embodiments may provide increased levels of data fidelity and data security by incorporating within the physical data transmission interface units appropriate data security assurance components, data compression and acceleration components and other data manipulation schemes or techniques whereby bulk data uploaded to the physical data transmission interface units may be securely stored in a manner that it cannot be "shared" with other data receivers and can be expeditiously transferred according to the embedded data control units and schemes.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for configuring a particularized portable data transfer device in a form of a Mobile Communication Gateway Unit (MCGU) to provide broad spectrum data acquisition worldwide, including through satellite communication backhauls, and data warehousing that is not data rate transfer, or otherwise available bandwidth, constrained for on-call data upload to fleets of vehicles, including aircraft, will be described, in detail, with reference to the following drawings, in which.

DESCRIPTION OF THE DISCLOSED EMBODIMENTS

Figure 1:
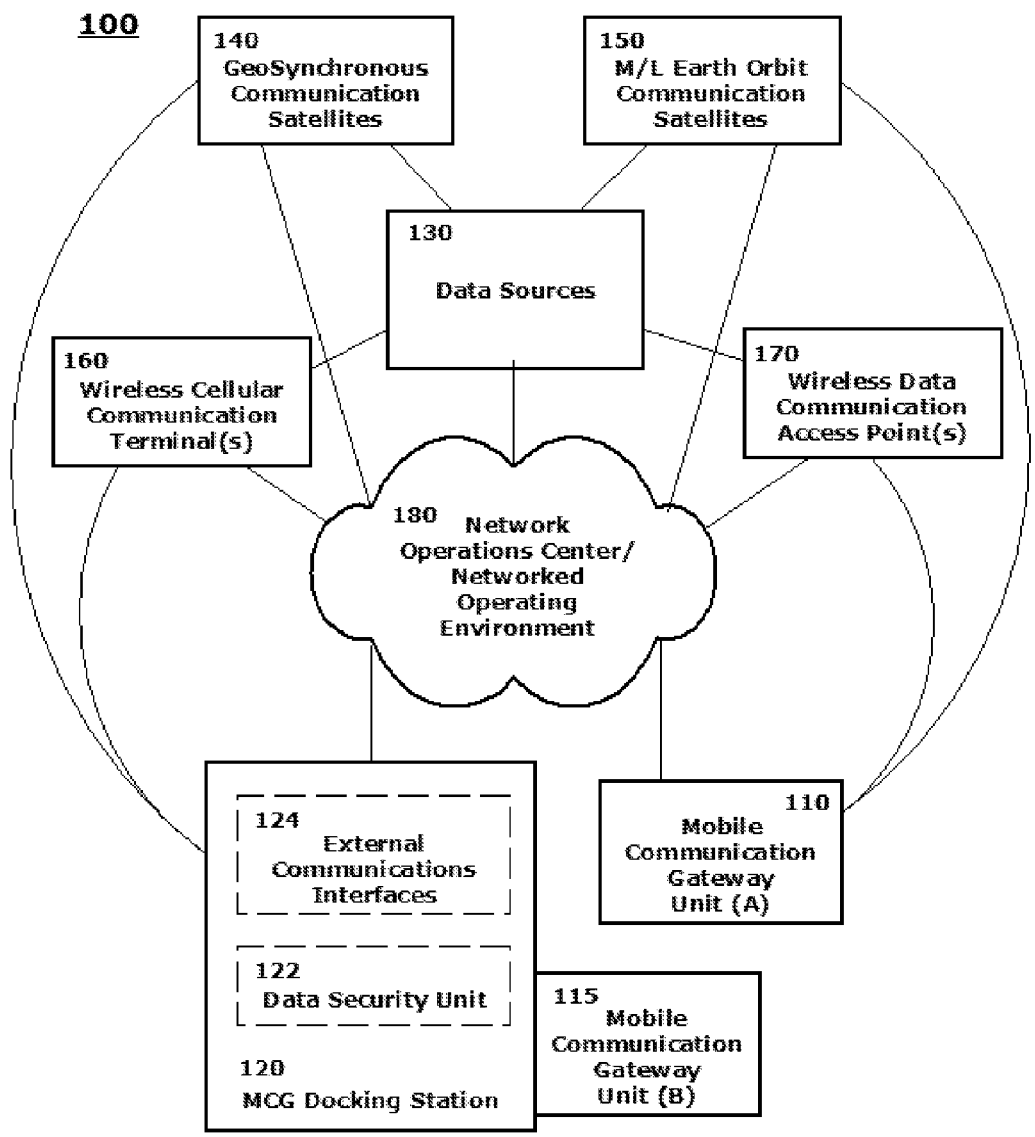
FIG. 1 illustrates a first exemplary overview of an operating environment in which one or more physical data transmission interface units may be employed to collect and secure data from one or more data sources to carry into effect the secure bulk data transfer and management schemes according to this disclosure.

The disclosed systems and methods for configuring a particularized portable data transfer device in a form of a Mobile Communication Gateway Unit (MCGU) to provide broad spectrum data acquisition worldwide, including through satellite communication backhauls, and data warehousing that is not data rate transfer, or otherwise available bandwidth, constrained for on-call data upload to fleets of vehicles, including aircraft, will generally refer to this specific utility for those systems and methods. Although the disclosed systems, devices, units, schemes, processes, methods and/or techniques may be described as being particularly adaptable to the upload of bulk data including IFE and EFB data to, for example, an aircraft parked at an aircraft terminal for a limited period of time, these descriptions should not be considered as limiting. Specifically, the systems and methods according to this disclosure may be equally applicable for data transmission (download) from the aircraft.

The disclosed descriptions may be further equally applicable to any one of myriad other types of vehicles at their respective terminals. Such vehicles may include, for example: busses and other wheeled vehicles (and the stations and/or depots from which those busses and other wheeled vehicles may operate); trains and other rail vehicles (and the stations from which those trains and other rail vehicles may operate); water and underwater vehicles, including ships (e.g., cruise ships), boats, submarines and the like, (and the piers, facilities and terminals from which such vehicles may operate). In all cases, the vehicles may be manually operated by onboard crews or may be operated by local or remote automated means.

The disclosed descriptions, and particularly any detailed review of a particular communication, employment and/or data exchange scenario, should not be interpreted as specifically limiting the disclosed schemes to any particular situation or occurrence, operating scenario, and/or configuration of a networked communicating system for carrying into effect the disclosed schemes. In fact, the systems and methods according to this disclosure may be equally applicable to any on-call, compressed turnaround, local operational upload of bulk data to any server, particularly when an elapsed time for a bulk data transfer event itself must be compressed within other communication tasks and operational constraints, all of which operating scenarios are contemplated as being covered by this disclosure.

The systems and methods according to this disclosure will be described as being particularly usable for data transmission via wired communication between a portable MCGU and an aircraft (or other vehicle). These descriptions are also intended to be illustrative and not constraining the disclosed portable MCGU as necessarily having any particular configuration or as necessarily operating according to any specific communication, data security, data compression, and/or data transfer acceleration scheme, technique or protocol. Additionally, use of the term "portable" is not intended to constrain embodiments of the disclosed MCGU as being capable of being hand-carried to the aircraft. The disclosed MCGU may be, for example, vehicle mounted or otherwise conveyable.

As will be described in greater detail below, under any employment scenario, bulk data transmission to (and upload in) the disclosed MCGU may be effected by plugging in a cable between a docking station and the physical MCGU, or may be effected by mounting the disclosed MCGU in a compatible "docking station" arrangement. Further, communication protocols continue to emerge to facilitate short range line of sight increased bandwidth high data rate wireless communication interface between transmitting and receiving nodes. The disclosed systems and methods may employ such available wireless communication links according to the spirit and scope of this disclosure to provide unimpeded, frequency deconflicted and comparatively interference free, high rate bulk data transmission exchange between, for example, the MCGU and an aircraft or other vehicle mounted server. No particular constraint to a specified wireless communication protocol is intended to be implied by the exemplary descriptions provided in this disclosure.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

The disclosed MCGU devices and the schemes for employment of those devices are based on a class of portable physical hand carried devices that are described, for example, in U.S. Pat. No. 7,949,335 as "Multi-modal portable communications gateway(s)." The MCGU devices according to this disclosure may be provided to uniquely selectably connect with one of myriad data sources via any one or more of a selectable menu of communication links. The operative communication link, at any given time, may be chosen according to a most efficient and cost-effective data transmission scheme to meet particular operator requirements in a manner that was not contemplated at the time of the 335 patent.

The disclosed MCGU devices and use cases may provide for the collection of data from a selectable network and/or communication link while the device is generally at rest in a data collection mode, for example, in a passenger terminal or maintenance hangar area. When an aircraft arrives, an operator, e.g., a mechanic, may transport the MCGU device from its at rest location to, or on board, the aircraft. The MCGU device may associate, and/or establish communication, with an aircraft onboard data server component via a particularly configured external communication interface or, in certain implementations/embodiments an aircraft wireless router system. Once in communication with the aircraft data server, the MCGU device may commence bulk data transfer to and/or from the aircraft. In this manner, during a compressed turnaround time between aircraft arrival and departure, bulk data upload and download may be effected. The data upload may update IFE files stored in the aircraft server to provide the latest content for passenger access, and/or may update EFB data exchange files that may be accessible to the aircraft crew. When the aircraft departs, any downloaded data stored in the MCGU device may be delivered though a selected wireless network to a data entity for processing. This cycle may be repeated over and over.

In this regard, the disclosed schemes require nearly complete reconfiguration and/or re-programming of the MCG disclosed in the 335 patent to operate, for example, as a domain within a virtualized machine environment. The disclosed configurations and implementations may allow higher level routing functions to be performed on a single portable commercial off the shelf (COTS) communicating/computing component or system of connected components specifically configured and programmed to provide a simultaneous interface to a SATCOM data backhaul channel and an off-board aircraft channel.

The disclosed schemes may separately enable, in a distributed aircraft network, a system and method for key exchange, use and maintenance utilizing a central trusted PKI network entity serving as a data traffic routing system. The disclosed schemes are intended to improve on an "order wire" concept of co-owned U.S. Pat. Nos. 8,176,520 and 6,741,841. The disclosed schemes, aware of the previously-disclosed concepts which suggested the order wire as a means for prescribing what data is to be accepted, extend significantly further in employing a data warehousing concept that additionally includes a protocol for exchanging and maintaining keys wirelessly to a remote aircraft node.

The disclosed schemes may provide a unique device and operating/employment scenario for: (1) Implementing a previously unavailable security method that facilitates delivery and protection of IFE and EFB data in a manner that allows a content provider to be assured of the non-accessibility of the provided content outside authorized channels; (2) Implementing a network access and routing process to connect an MCGU to an available and selectable communication link, including satellite or wireless ground network connected to the Internet for reach back to the Internet when available to facilitate data transfer according to selectably cost-effective transfer schemes and communication paths; and (3) Implementing a capacity and capability to store, secure and forward substantial data as networks become available in a generally non-time-dependent manner.

Aircraft (or other vehicles) normally operate as wireless "nodes" or clients on the Internet like any other nodes today including smartphones, tablets, fixed and portable computers and the like. Difficulties often arise, however, in maintaining consistent enough communication links to promote consistent data exchange due to (1) complexities in maintaining a mobile IP address, (2) non-availability of aircraft broadband at times and in certain locations or (3) a configuration of an aircraft communications and avionics suite that lacks a long haul mobile wireless linking component for consistent links directly back to the Internet. The disclosed systems and methods are intended to provide, among other objectives, an alternate method to securely exchange data to mitigate the known shortfalls in current implementations, including those enumerated above. In short, the disclosed MCGU provides a secure means for hand carrying stored data taken from the Internet for uploading and downloading while the aircraft is parked at the gate or near a hangar, even and generally for an abbreviated period of time during which direct and continuous communication with an aircraft data server is maintained.

The disclosed schemes employ the MCGU as a mobile store and forward device that is uniquely configured physically, and in its employment, to address security concerns that may be unique to delivering IFE or EFB data to an aircraft, or fleet of aircraft. Movie content suppliers from Hollywood, for example, must be increasingly (if not absolutely) assured of the security of their digital content in the hands of, for example, an airline, i.e., that there is generally no possibility that the content of their supplied bulk data files can be pirated, intercepted or otherwise stolen files. Loss of control of early distributions of their entertainment content (first run movies) distributed to the airlines in a manner that the content gets into the stream of commerce in an unauthorized manner can be detrimental to their business. The proposed schemes seek to address this issue in ensuring that, at no time, is the data present in an unencrypted form in an MCGU. The content is transferred to, stored in and transferred from the MCGU securely. Additionally, no security implementing information such as, for example, passwords, private encryption keys or the like is ever stored in the MCGU in a manner that would provide an individual (hacker), in even temporary possession of the MCGU, an opportunity to unlock and pirate the secured content, including IFE data.

The disclosed systems and methods may particularly address this specific need to get IFE or EFB data securely to the aircraft by using the portable MCGU. In a simple overview of an employment scheme, the MCGU is configured to selectably communicate with one or more data sources for secure bulk data upload to occur over an extended period of time away, and independent, from any particular aircraft (or other vehicle). The MCGU is then transported to a close proximity to an aircraft (or other vehicle) where wired or short range high data rate wireless communication is established between the MCGU and the aircraft data storage and computing, and/or data server, system. The MCGU thus provides an only means to attain the efficient voluminous data exchange for bulk data on and off the aircraft, while maintaining security of the data throughout the process. In addition to uploading IFE and EFB data to the aircraft, volumes of maintenance data can be downloaded (retrieved), secured in the MCGU and delivered from the aircraft to a maintenance center for later review and analysis.

In a particular illustrative exemplary operational embodiment, the aircraft may have at least one data server that may have an embedded client component that generates a private and public key when the aircraft data server is in need of, or is scheduled to, receive IFE data and/or EFB data in bulk. The aircraft data server and the content provider entities may each be issued certificates from a trusted certification authority. One of the entities may request a media update. The requesting entity may be the aircraft data server (programmed to request new data based on a schedule). There separately may be an order wire from an entity (airline operations, content provider, central media distribution authority, or the like) authorizing the aircraft's server to initiate an update or to request new content from the content provider.

Once the request for new media itself has been authenticated by the aircraft data server, the aircraft data server may generate a pair of public and private keys, a certificate and a hash of a message, all according to known encryption schemes. The generated public key, certificate and hash may be delivered optionally to a third party for certificate verification, or may be delivered directly to the entity (content provider) responsible for preparing encrypted IFE data content. One manner by which to deliver the generated public key, certificate and hash may be to have the MCGU obtain the secure data elements from the aircraft when the MCGU is associated, or otherwise in communication, with the aircraft wireless network and/or data server when the aircraft is parked. The MCGU may then deliver a particular request to a data source, i.e., the entity with the content or acting as the content provider, and may optionally involve a certificate assurance entity in the request and retrieval process. The content provider may then also exchange a certificate with the MCG. According to this scheme, it will be recognized that only public keys are exchanged while the content provider keeps any of its private keys as well. In this example, the private key never moves as it is intended to be used only for decryption of encrypted (ciphered) data when the data is presented to the aircraft data server by way of an established communication connection with a portable MCGU temporarily storing the data.

Encrypted (or otherwise ciphered) IFE data content may then be delivered to the MCGU by way of an available, negotiated, and/or selected communication link or network. A non-exclusive list of the typical communication links includes satellite (OneWeb® Ltd., Iridium® Communications, Inc. or Inmarsat® PLC) communication connections, cellular telephone communication connections, wireless Wi-Fi communication connections, or wired Ethernet communication connections. For aviation applications specifically, for example, particularized communication links may include AeroMACS, a 5.05-5.150 GHz wireless band (employing WiMax hardware technology). AeroMACS was set up by the FAA, NASA and a world consortium to provide a new ground wireless network to aid in the off load traffic from ACARS and other systems. The MCGU itself, or, for example a docking station into which the MCGU may be inserted (plugged) may include an appropriately configured external communication interface to support establishing such a communication link/network for up and downloading information for store and forward.

In embodiments, the MCGU may initially negotiate and/or otherwise select an available backhaul network for, for example, routing data to the Internet based on channel availability, a comparatively lower cost of "per unit" data exchange on an available channel, any timing constraints regarding the required data exchange, and/or other time, cost, availability, security, and data fidelity parameters.

Once the IFE data content provider has delivered and checked the encrypted file, the MCGU may securely hold the delivered encrypted data in the file until an occasion at a future time that the MCGU detects and is associated, or otherwise made to communicate, with an aircraft network, which may be via a short range wireless or wired data exchange connection. Once the data exchange connection is established, the MCGU may then proceed to download the encrypted IFE data file(s) through the aircraft router to the aircraft data server acting as an IFE file data storage component. A secure environment in the aircraft data server may be subsequently used to decipher the encrypted IFE data on demand, or request, of the user to be displayed on one or more IFE (or other) data display components available to individual users at their passenger seats in the aircraft passenger compartment, for example. It will be recognized that, in embodiments, encrypted (ciphered) IFE data content may be delivered to the data display components for decryption at that point in the data exchange network. In embodiments, individual users may locally operate their own wireless devices to which, for example, a temporary key may be supplied to decipher the IFE data content within the users' own wireless devices, in real time, using, for example, an approved or authorized codec that does not store information.

In a similar manner, in embodiments, aircrew on the flight deck may request data updates via their EFBs. The aircraft data server may respond to such requests by uploading appropriate MCGU-transferred data in much the same manner as was described for the IFE data content. EFB-loaded data may include, but not be limited to, updates regarding weather, NOTAMS or other information valuable to the aircrew in conducting safe and efficient operations of the aircraft. In a particular use case, the MCGU may be usable, for example, to facilitate and implement an FTP download of the entire NOAA website with all the latest snapshots of Weather and METARS and other aviation related information. The unit may be used to quickly download this information to the aircraft data server in the manner described for access by a pilot's EFB. In embodiments, the aircraft router may receive stored encrypted from the aircraft data server and route that data throughout aircraft including to the flight deck (specifically for the described EFB data) and aircraft cabin (specifically for the described IFE data).

In embodiments, the MCGU may stay on the ground, or otherwise be physically loaded into the aircraft avionics suite and carried away on the aircraft. In such instances, the MCGU may optionally be connected and updated via an aircraft air-to-ground data communication link, or a commercial satellite data communication link, or the like, provided by the aircraft communication and/or avionics suite. Such a data communication connection could be direct with an aircraft radio, or through connectivity with one or more external communication interfaces associated with, for example, an aircraft off-board communication interface connectivity system/router.

In embodiments, onboard data storage systems may provide sufficient storage capacity to store the bulk data in a manner that makes the stored bulk data multiply accessible by multiple users at different times according to each requesting user's desires while embarked in the vehicle. The data content may be routed to multiple users, individually upon request of each of the multiple users, according to known means.

Whether it is IFE data, EFB data, other Internet-available data or any other data in general, the steps of initiating the data retrieval process may uniquely include: (1) Generating or implementing a pre-determined (dates/times) download schedule locally in the MCGU; (2) Receiving a download schedule provided by external communication with a content provider; (3) Initiating a scheduled or on-call download in real time by according to aircraft system provided scheduling information; and/or (4) Receiving initiation instructions/guidance in real-time communication by a system, system component or other source off the aircraft, including a manual intuition by a operator or user of the MCGU.

FIG. 1 illustrates a first exemplary overview of an operating environment 100 in which one or more MCGU devices (elements 110,115) may be employed to collect and secure data from one or more data sources 130 to carry into effect the secure bulk data transfer and management schemes according to this disclosure. As shown in FIG. 1, the exemplary operating environment 100 may encompass myriad lines of communication (wired or wireless) between the data sources 130 and an autonomously updateable mobile communication gateway unit (MCGU) (A) 110, or an MCG docking station 120 that may connect directly to a MCGU (B) 115. Each of the MCGU (A) 110 and the MCG docking station 120 respectively may include a series of selectable external communication interfaces that may be employed to connect individually and independently to myriad communication links/networks generally in the manner shown. Additional details regarding the internal components and/or functioning of MCGUs, such as MCGU (A) 110 and MCGU (B) 115 shown in FIG. 1, will be described in greater detail below and with regard to the detail shown in FIG. 3. In embodiments, the MCG docking station 120 may comprise a series of selectable external communication interfaces 124 and the unit such as, for example, data security unit 122 that supports, facilitates, or otherwise implements a data encryption scheme associated with data transfer between data sources 130 and the MCGU (B) 115. In this regard, certain of the communicating and data handling (translation or security) functions may reside in the MCG docking station 120 rather than in one or more MCGUs.

The data sources 130 may include IFE content providers that may supply movies, Internet content, audio selections, electronic games, advertisements, and other like content. The data sources 130 may include flight deck or EFB data content providers that may supply weather data, updated maps, NOTAMs, current flight planning data and other like content. The data sources 130 may also include data warehousing nodes that may receive, for storage and analysis, aircraft maintenance data, aircraft sensor data, aircraft operating data, aircraft warranty-related information, and other like data downloaded from an aircraft, for example, into one or more MCGUs.

The particular lines of communication may include, but are not limited to, geosynchronous communication satellites 140, medium and/or low (M/L) Earth orbit communication satellites 150, wireless cellular communication terminals (and hubs) 160, and wireless data communication access points (such as, for example, Wi-Fi access points) 170. Each of these selectable lines of communication may connect directly to one or more of the multiple data sources 130. Each of the selectable lines of communication may then connect with the MCGU (A) 110 or the MCG docking station 120 directly or through some manner of Network Operations Center (NOC) and/or a networked operating environment 180. As indicated above, the data sources 130 may include content providers for IFE or EFB data, which may be delivered to the MCGU (A) 110 or the MCGU (B) 115, generally along the lines of communication shown in FIG. 1.

Figure 2:
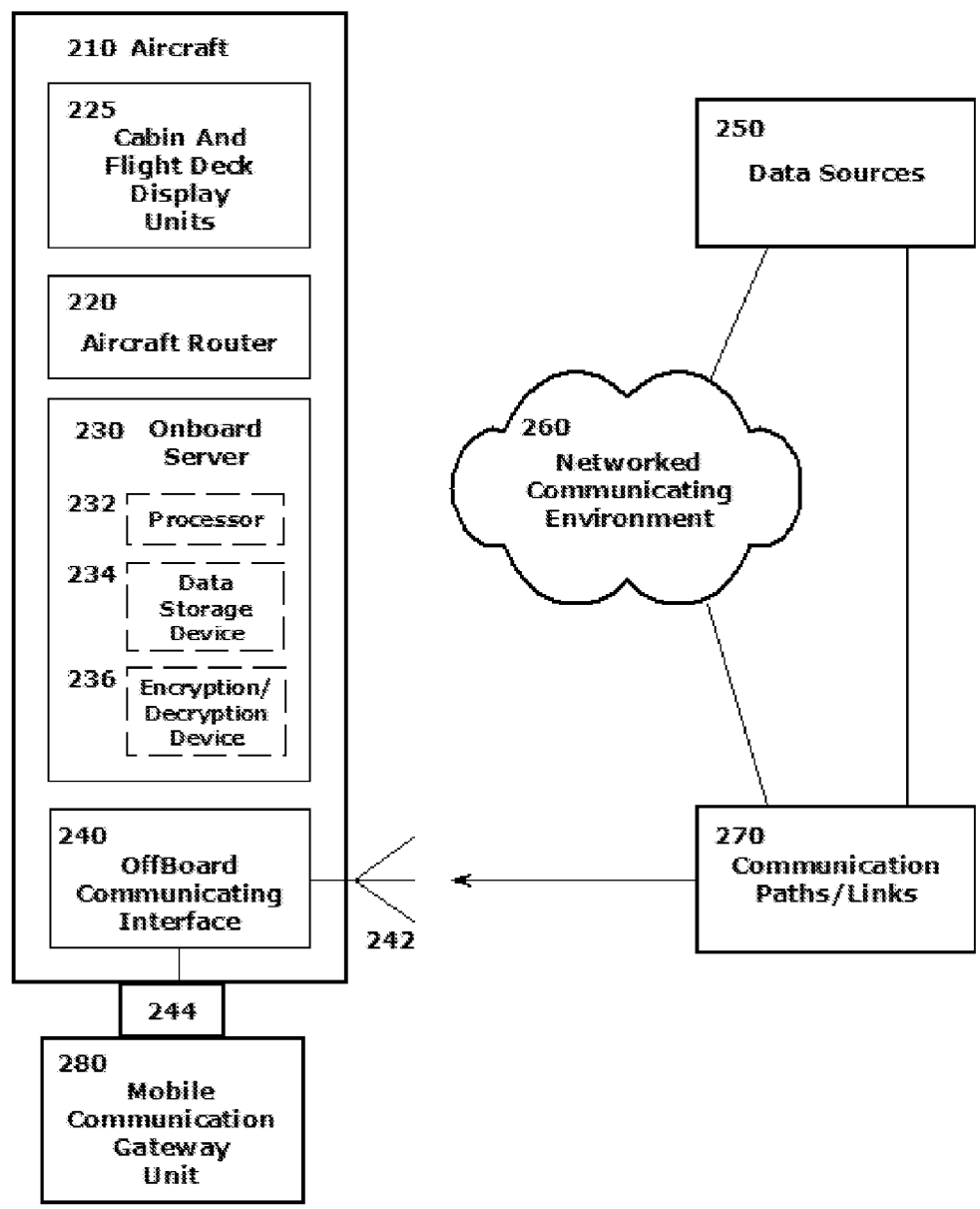
FIG. 2 illustrates a second exemplary overview of an operating environment in which one or more physical data transmission interface units may be employed to undertake data exchange with a vehicle, including an aircraft, to effect the secure bulk data transfer and management schemes according to this disclosure.

FIG. 2 illustrates a second exemplary overview of an operating environment 200 in which one or more physical data transmission interface units may be employed to undertake data exchange with a vehicle, including an aircraft, to effect the secure bulk data transfer and management schemes according to this disclosure. To an extent that FIG. 1 illustrates an overview of the operating environment by which upload a bulk data from data sources to an MCGU may be implemented, the depiction of the "other side" of the operating environment 200 shown in FIG. 2, provides exemplary details regarding how information loaded into an MCGU 280 man be further uploaded to a vehicle, in this case aircraft 210.

At the outset it should be recognized that any capacity of an MCGU 280 to provide specified bulk data update to an aircraft onboard server 230 does not replace other data source communication that is effected by the aircraft avionics suite. The aircraft 210 retains its necessary capability to communicate with multiple data sources 250 over myriad communication path/links 270 be a direct communications with those data sources 250 or by communicating with the data sources 250 through some manner of networked communicating environments 260. In this regard, as is well known, the aircraft avionics suite may include an off for communicating interface 240 which may be supported by one or more antenna 242, which may be in a configuration of multiple antenna arrays protruding from, or conform with an outer skin of the aircraft to 10 to facilitate communication capacity via each of the appropriate communication path/links 270. These facilitated communications may include short-range Wi-Fi (or other protocol) enabled wireless communications between the aircraft 210 and an accessible communication node (as one of the communication paths/links 2700 while the aircraft 210 is parked, for example, at a terminal gate.

In embodiments, the aircraft avionics suite may include an aircraft router 220 for routing information between individual avionics components and the onboard server 230, and between the onboard server 230 and a plurality of cabin and flight deck display units 225 for displaying stored content to passengers in the aircraft cabin, and/or to aircrew on aircraft flight deck. The plurality of cabin and flight deck display units 225 may include aircraft mounted display components and devices, or may include display screens associated with mobile electronic computing and/or communicating devices carried by the passengers or the aircrew. The onboard server 230 may include a processor 232, a data storage device 234 (which may be employed to store bulk data in support of the schemes outlined in this disclosure) and an encryption/decryption device 236 that may be employable to implement secure data transfer in the manner described above.

In embodiments, the offboard communicating interface 240 may be used, as indicated, to facilitate external communications to and from the aircraft via communication paths/links 270. According to the disclosed schemes, the offboard communicating interface 240 may separately include the particularized interface 244 for facilitating directed data communication between the onboard server 230 and the MCGU 280. In this regard, the particularized interface 244 may comprise a wired connection by which the MCGU 280 may be plugged into the aircraft 210 to facilitate secure bulk data transfer between the MCGU 280 and the onboard server 230. Separately or additionally, the particularized interface 244 may comprise a short range wireless interface operating according to a protocol that enables direct (and generally interference free) high rate data transfer along a secure short range data transfer path. Such a wireless connection may be implemented using RF, optical or other near field communication (NFC) capabilities (as those capabilities are now known, or may be in the future developed to facilitate high bulk data rate transfer schemes according to the disclosed methods). In embodiments, the particularized interface 244 may be directly associated with the aircraft router 220 instead of the offboard communicating interface 240.

Figure 3:
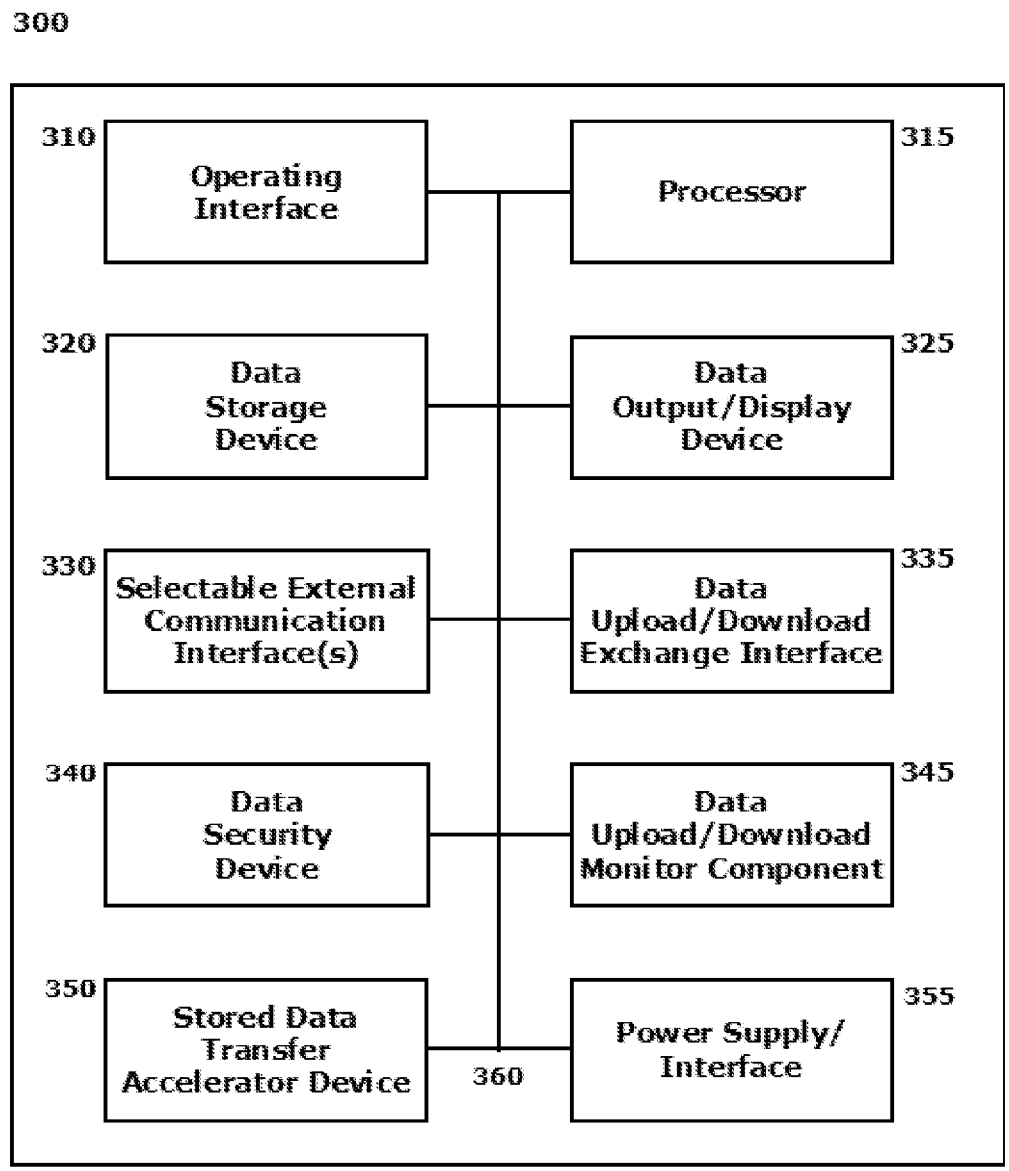
FIG. 3 illustrates a block diagram of an exemplary embodiment of a physical data transmission interface unit for carrying into effect the bulk data uploading, storing, securing, transporting and downloading according to the disclosed secure bulk data transfer and management schemes.

FIG. 3 illustrates a block diagram of an exemplary embodiment of a MCGU 300 for carrying into effect the bulk data uploading, storing, securing, transporting and downloading according to the disclosed secure bulk data transfer and management schemes. The exemplary MCGU 300 shown in FIG. 3 may be implemented as a hand-carried or otherwise portable unit that, once securely loaded with bulk data, is transportable to a vicinity of a vehicle, in order to interface with that vehicle for secure bulk data transfer to servers within the vehicle. Certain components or functions of the exemplary MCGU 300 may be implemented as a combination of system components associated with the exemplary MCGU 300, including as cloud-based processing and data storage components.

The exemplary MCGU 300 may include an operating interface 310 by which a user or operator may communicate with the exemplary MCGU 300 for directing operations of the exemplary MCGU 300 in implementing the secure bulk data store and forward schemes according to this disclosure. The user interface 310 may be usable to (1) select among a plurality of individual communication paths, links or networks available to a selectable external communication interface 330, (2) initiate communication with one or more data sources via the selected one of the plurality of individual communication paths, and/or (3) initiate a secure data transfer with the one or more data sources according to the schemes detailed above. Control, coordination and communication inputs received in the exemplary MCGU 300 via the operating interface 310 may be processed and communicated to the data sources in communication with the MCGU 300 via the selected communication path.

The operating interface 310 may be a part or a function of a graphical user interface (GUI) mounted on, integral to, or associated with, the exemplary MCGU 300. The operating interface 310 may alternatively take the form of any commonly known user-interactive device by which user inputs and/or commands are input to an automated processing system including, but not limited to, a keyboard or a touchscreen, a mouse or other pointing device, a microphone for providing verbal commands, or any other commonly-known operating interface device.

The exemplary MCGU 300 may include one or more local processors 315 for carrying out the individual operations and functions of the exemplary MCGU 300. The processor 315 may reference, for example, each communication with one or more data sources to determine whether information is presented that identifies, for example, a schedule by which bulk data may be made available by the data source for upload to the exemplary MCGU 300, and particularly to a local storage device 320 house within, or otherwise associated with, the exemplary MCGU 300. The processor 315 may direct exchange of security protocol information including, but not limited to, generated public keys, certificates and/or hashes, to facilitate secure data transfer from the one or more data sources. When the exemplary MCGU 300, is transported to a vicinity of a vehicle, the processor 315 may initiate communications with, coordinate a security implementation scheme in, and/or direct bulk data upload to a bulk data storage component, including a data server, within the vehicle.

The exemplary MCGU 300 may include one or more data storage devices 320. Such data storage device(s) 320 may be used to store data or operating programs to be used by the exemplary MCGU 300, and specifically the processor(s) 315 in carrying into effect the disclosed operations and functions. Data storage device(s) 320 may be used to securely store bulk data uploaded to the exemplary MCGU 300. Operational information similarly downloaded from the vehicle may be stored for later analysis and other beneficial purposes.

The data storage device(s) 320 may include a random access memory (RAM) or another type of dynamic storage device that is capable of storing updatable database information, and for separately storing instructions for execution of system operations by, for example, processor(s) 315. Data storage device(s) 320 may also include a read-only memory (ROM), which may include a conventional ROM device or another type of static storage device that stores static information and instructions for processor(s) 315. Further, the data storage device(s) 320 may be integral to the exemplary MCGU 300 in order to facilitate the secure bulk data storage requirements according to the disclosed schemes, or may be provided external to, and in wired or wireless communication with, the exemplary MCGU 300, including as cloud-based storage and/or processing elements when storing information and/or operating instructions for the exemplary MCGU 300.

The exemplary MCGU 300 may include at least one data output/display device 325, which may be configured as one or more conventional mechanisms that output information to a user, including, but not limited to, a display screen on a GUI associated with the exemplary MCGU 300 to provide a user or operator with appropriate inputs to allow the user or operator to interact with the exemplary MCGU 300 in carrying into effect any of the schemes, methods or functions of the exemplary MCGU 300 including, but not limited to, establishing communication with one or more data sources via a selectable communication network/LAN, executing a secure data exchange scheme with the one or more data sources, and/or initiating data upload either from the one or more data source to the exemplary MCGU 300 or otherwise from the exemplary MCGU 300 to the vehicle with which the exemplary MCGU 300 is brought into proximate contact for short-range communication. Appropriate feedback may be provided to the user or operator of the exemplary MCGU 300 regarding a status of any information exchange and/or form of data upload and download, as appropriate.

The exemplary MCGU 300 may include one or more selectable external communication interfaces 330. Each of the one or more selectable external communication interfaces 330 may be particularly configured to establish communication with one or more data sources along particularly selectable data communication paths/links, or via particularly selectable data communication network. The one or more selectable external communication interfaces 330 may be particularly configured, for example, to facilitate Ethernet communication connectivity, SATCOM communication connectivity, mobile wireless access point data communication connectivity (according to Wi-Fi or other data exchange protocol), AeroMACS communication connectivity as described above), and/or cellular communication connectivity (according to LTE, 3G, 4G, 5G or other communication standard). In this regard, network communications may be undertaken via a satellite connected NOC or network, a base station contractor/operator, a wireless router connected network, an AeroMACS connected network, an Internet connected network, or a public switched telephone network (PSTN).

The exemplary MCGU 300 may include a data upload/download exchange interface 335. It is this exchange interface 335 that may be particularly configured to mate, or otherwise communicate, with both of a MCG docking station via which certain data upload functions from the multiple data sources may be facilitated in a manner that, for example, reducing maternal computing overhead required by the exemplary MCGU 300. Separately, such an exchange interface may be particularly configured to mate, or otherwise communicate, with a compatible data exchange port associated directly with the vehicle for wired or short-range wireless communication with system components of the vehicle that facilitate secure data upload from the exemplary MCGU 300 to the vehicle, including to a data server or other data storage unit in the vehicle.

The exemplary MCGU 300 may include a security device 340 that may confirm implementation of security (encryption or ciphering or like) protocols to ensure security of data exchange with the exemplary MCGU 300, and storage of bulk data in the exemplary MCGU 300. The data security device 340 may exist as a component function executed by the processor 315 in communication with the data storage device 320, or may represent a standalone device or unit within the exemplary MCGU 300.

The exemplary MCGU 300 may include a data upload/download monitor component 345 that may be usable to monitor a progress of a particular data upload from a content provider to the exemplary MCGU 300 over a comparatively protracted period of time, or to monitor a progress of a download of stored bulk data from the exemplary MCGU 300 to a vehicle data server in a comparatively abbreviated period of time. The data upload/download monitor component 345 may display a progress of the data upload or download, including a percent completion, and/or a time to complete, on a data output/display device 325. The data upload/download monitor component may exist as a component function executed by the processor 315 in communication with the data storage device 320, or may represent a standalone device or unit within the exemplary MCGU 300.

The exemplary MCGU 300 may include a stored data transfer accelerator device 350. In such an accelerator device 350, data compression and/or decompression schemes may be implemented in order to aid in most efficiently (and most quickly) completing a download of stored bulk data from the exemplary MCGU 300 to the vehicle data server. The stored data transfer accelerator device may exist as a component function executed by the processor 315 in communication with the data storage device 320, or may represent a standalone device or unit within the exemplary MCGU 300.

The exemplary MCGU 300 may include a power supply/interface 355. The power supply/interface 355 may comprise one or more internal batteries, one or more connections to an external power source, or a combination of the two. In embodiments in which the exemplary MCGU 300 is a hand-carried device, a local internal power supply may be deemed most effective. In embodiments, however, in which the exemplary MCGU 300 may be transported to the vicinity of a (target) vehicle by another (support) vehicle, the power supply/interface 355 may involve an electrical connection between the exemplary MCGU 300 and the support vehicle. No particular limitation to the configuration of the power supply/interface 355 is intended to be implied by the above description.

All of the various components of the exemplary MCGU 300, as depicted in FIG. 3, may be connected internally by one or more data/control busses 360. These data/control busses 360 may provide wired or wireless communication between the various components of the exemplary MCGU 300, whether all of those components are housed integrally in, or are otherwise external and connected to, other components of the exemplary MCGU 300.

It should be appreciated that, although depicted in FIG. 3 as an essentially integral unit, the various disclosed elements of the exemplary MCGU 300 may be arranged in any combination of sub-systems as individual components or combinations of components, integral to a single unit, or external to, and in wired or wireless communication with, the single unit of the exemplary MCGU 300. In other words, no specific configuration as an integral unit or as a support unit is to be implied by the depiction in FIG. 3. Further, although depicted as individual units for ease of understanding of the details provided in this disclosure regarding the exemplary MCGU 300, it should be understood that the described functions of any of the individually-depicted components may be undertaken, for example, by one or more processors 315 connected to, and in communication with, one or more data storage device(s) 320, all of which may support store and forward operations in the exemplary MCGU 300.

Figure 4:
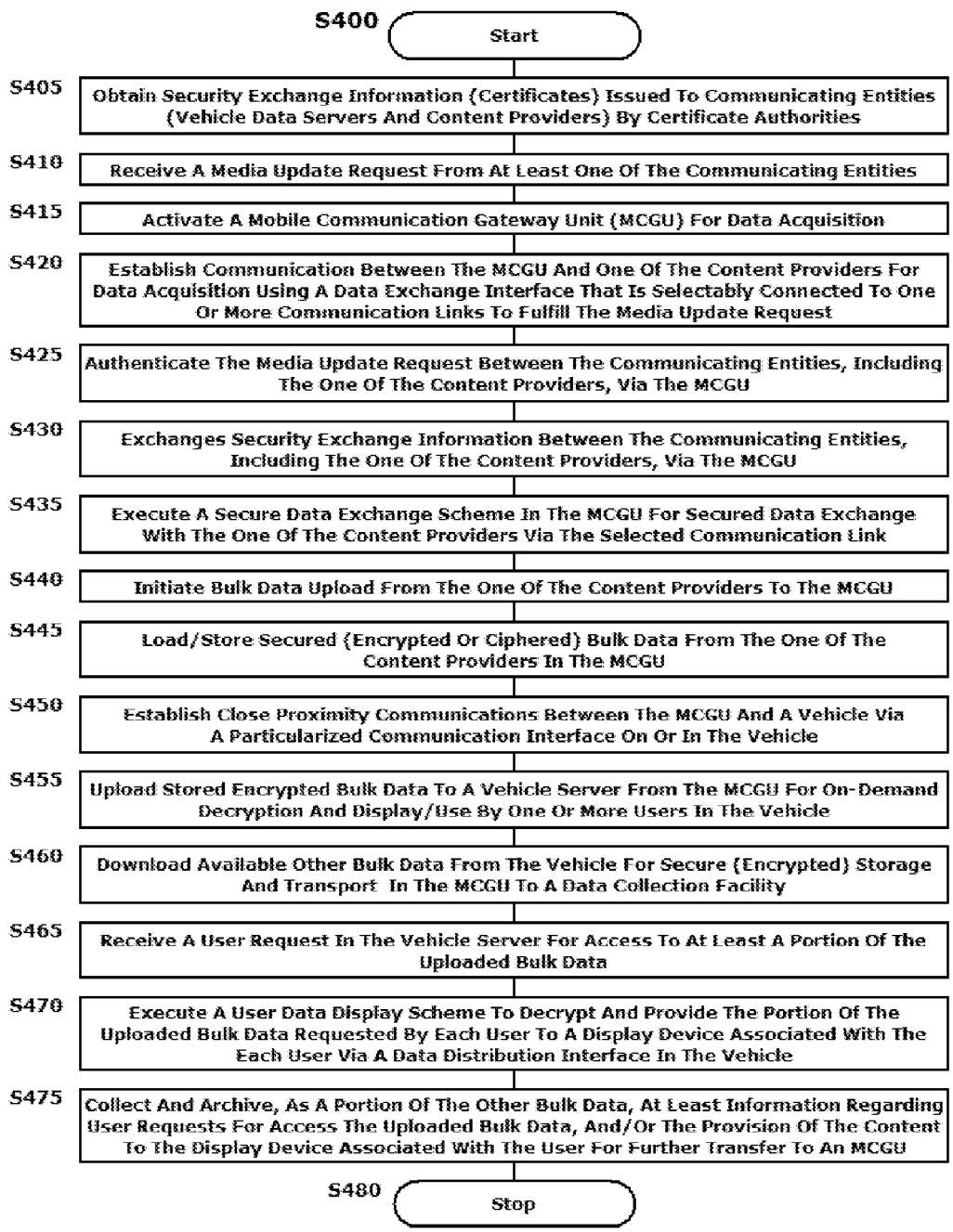
FIG. 4 illustrates a flowchart of an exemplary method for implementing secure bulk data transfer and management schemes according to this disclosure.

The disclosed embodiments may include an exemplary method for implementing secure bulk data transfer and management schemes. FIG. 4 illustrates an exemplary flowchart of such a method. As shown in FIG. 4, operation of the method commences at Step S400 and proceeds to Step S405.

In Step S405, security exchange information (PKI certificates and the like) may be obtained by communicating entities (including vehicle (aircraft) data servers and data sources, acting as the content providers) from one or more trusted certification authorities. Operation of the method proceeds to Step S410.

In Step S410, a media update request may be received from at least one of the communicating entities. Operation of the method proceeds to Step S415.

In Step S415, a MCGU may be activated for data acquisition. The activation may be according to a pre-determined scheduled request set by at least one of communicating entities acting as a content provider for bulk data to be uploaded to the MCGU, a vehicle data server in a vehicle to which the bulk data is to be downloaded from the MCGU, or an associated entity generally overseeing the bulk data upload and download via the MCGU. Otherwise, the activation may be according to a manual user input received by, for example, a processor in the MCGU. Operation of the method proceeds to Step S420.

In Step S420, communication may be established between the MCGU and one of the content providers for the data acquisition using a data exchange interface in, or associated with, the MCGU (or a supporting docking station) that is selectably connected the one or more identified communication links available between the MCGU and the one of the content providers to fulfill the media request. Operation of the method proceeds to Step S425.

In Step S425, the media update request may be authenticated between the communicating entities via the MCGU. Operation of the method proceeds to Step S430.

In Step S430, security information may be exchanged between the communicating entities. The security information may include a public key, a certificate and hash information received from one or more of the communicating entities, the content provider, a target vehicle data server, or both. In embodiments, once the media update request has been authenticated via the MCGU, the public key, certificate and request for new content may be forwarded to the content provider via the MCGU. Operation of the method proceeds to Step S435.

In Step S435, a secure data exchange scheme may be executed in the MCGU to establish secure data exchange communication between the one of the content providers and the MCGU via the selected communication link. Operation of the method proceeds to Step S440.

In Step S440, bulk data upload may be initiated from the one of the content providers to the MCGU. Operation of the method proceeds to Step S445.

In Step S445, secured (or encrypted or ciphered) bulk data may be loaded, and/or stored, from the one of the content providers into the MCGU. The secure storage of bulk data in the MCGU assures the content provider that, even if unauthorized accesses obtained to the MCGU, no unauthorized access may be gained to the secured content. Operation of the method proceeds to Step S450.

In Step S450, the MCGU may be transported to a vicinity of the vehicle and close proximity communication between the MCGU and the vehicle may be established. In embodiments, this close proximity communication may be by a connected (wired) data exchange connection, or may be by a short range, high rate (substantially interference-free) wireless data exchange connection. Operation of the method proceeds to Step S455.

In Step S455, encrypted bulk data stored in the MCGU may be uploaded to a vehicle server from the MCGU. This bulk data may be of a content that may provide on-demand display and use, once decrypted, by one or more users in the vehicle. Operation of the method proceeds to Step S460.

In Step S460, in a same or different data communication period/session established between the vehicle and the MCGU, available other bulk data may be downloaded from the vehicle for secure (encrypted) storage and transport in the MCGU to a data collection (and analysis) facility. Operation of the method proceeds to Step S465.

In Step S465, a user request may be received in the vehicle data server for access to at least a portion of the uploaded bulk data. Operation of the method proceeds to Step S470.

In Step S470, a user data display scheme may be executed by the vehicle server to decrypt and provide the portion of the uploaded bulk data requested by each user to a display device associated with the each user via a data distribution interface (vehicle data router) in the vehicle. Operation of the method proceeds to Step S475.

In Step S475, at least information regarding user requests for access to the at least the portion of the uploaded bulk data, and/or the provision of content to the display device associated with the user may be collected and archived, as a portion of the other bulk data to later be downloaded from the vehicle to the MCGU. Operation of the method proceeds to Step S480, where operation of the method ceases.

The disclosed embodiments may include a non-transitory computer-readable medium storing instructions which, when executed by a processor in or associated with the MCGU, may cause the processor to execute all, or at least some, of the functions that may be appropriate to implement the steps of the method outlined above.

The above-described exemplary systems and methods reference certain conventional communicating and/or computing components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating the disclosed store and forward techniques using many and widely-varied system components.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 4, except where execution of a particular method step is a necessary precondition to execution of any other method step. Although the above description may contain specific details, they should not be construed as limiting the claims in any way. Other configurations of the described embodiments are part of the scope of this disclosure. It will be appreciated that various of the above-disclosed and other features and functions, or alternatives thereof, may be desirably combined into many different systems or applications for execution. Although the above description may contain specific details, they should not be construed as limiting the claims in any way. Other configurations are part of the scope of the disclosed embodiments. For example, the principles of the disclosed embodiments may be applied to each MCGU individually, independently and separately carry out functions of the disclosed schemes. This enables each MCGU to enjoy the benefits of the disclosed embodiments even if any one of the large number of possible end-user MCGUs do not need some portion of the described functionality. In other words, there may be multiple instances of the disclosed system each processing the content in various possible ways. It does not necessarily need to be one system used by all MCGUs. Accordingly, the appended claims and their legal equivalents should only define the disclosed embodiments, rather than any specific examples given.

We claim:

1. A portable communicating system for bulk data delivery to a vehicle, comprising:
    a first communicating device that establishes communication with at least one data source according to a selectable one of a plurality of available communication links to facilitate backhaul transfer of bulk data from the at least one data source to the portable communicating system;
    a second communicating device that communicates directly with a vehicle when the portable communicating system is in close proximity to the vehicle to implement high data rate transmission of the bulk data to an onboard data server in the vehicle;
    a data storage device that stores the bulk data;
    a data security device that enables a secure data exchange protocol for (1) the transferring of the bulk data from the at least one data source to the portable communicating system, and (2) the storing of the bulk data in the data storage device;
    a data exchange coordinating device that is configured to
        receive an input that initiates a transferring of bulk data from the at least one data source to the portable communicating system;
        automatically select a transfer communication link for the first communicating device from among the plurality of available communication links;
        confirm with the data security device that the secure data exchange protocol is enabled for the selected transfer communication link;
        receive the bulk data from the at least one data source via the selected transfer communication link;
        store the received bulk data in the data storage device in a secure manner according to the secure data exchange protocol;
        receive an indication of communication being established with the onboard data server in the vehicle via the second communicating device;
        automatically initiate the high data rate transmission of the bulk data to the onboard data server in the vehicle via the second communicating device;
        receive an indication regarding available data stored in the onboard data server in the vehicle to be downloaded to the portable communicating system;
        automatically initiate high data rate reception of the available data from the onboard data server in the vehicle via the second communicating device; and
        direct storage of the available data received from the onboard server in the data storage device.

2. The portable communicating system of claim 1, the received input that initiates the transferring the bulk data being based on one of (1) a schedule established by the at least one data source, (2) a request from the vehicle, and (3) a manual user input via a user interface associated with the portable communicating system.

3. The portable communicating system of claim 1, the data security device operating according to a public key infrastructure as the enabled secure data exchange protocol.

4. The portable communicating system of claim 1, comprising a first modular unit integrally housing at least the second communicating device, the data storage device and the data exchange coordinating device.

5. The portable communicating system of claim 4, further comprising a separate second modular unit integrally housing at least the first communicating device and the data security device, the second modular unit being located remotely from any vehicle.

6. The portable communicating system of claim 5, the first modular unit being locally communicatively connected to the second modular unit for the transfer of the bulk data and storage of the bulk data in the data storage device.

7. The portable communicating system of claim 6, the first modular unit being operatively decoupled from the second operating device for transport to a vicinity of the vehicle.

8. The portable communicating system of claim 1, the second communicating device communicating directly with the vehicle via a wired communication connection between the second communicating device and the vehicle.

9. The portable communicating system of claim 1, the plurality of available communication links including (1) at least one communication link operating according to an AeroMACS standard and (2) at least communication link configured to establish a satellite communication connection.

10. The portable communicating system of claim 1, the at least one data source being a content provider for one of in-flight entertainment bulk data or electronic flight bag bulk data.

11. A method for providing bulk data delivery to a vehicle, comprising:
    receiving, with a processor in a portable communicating device, an input to initiate a transfer of bulk data from at least one data source to a portable communicating device;
    automatically selecting, with the processor in the portable communicating device, a transfer communication link for a first communicating device from among a plurality of communication links available for selection in the first communicating device;
    enabling, with a data security device, a secure data exchange protocol for the transfer of the bulk data from the at least one data source to the portable communicating device over the selected transfer communication link;

receiving and securely storing the transfer of the bulk data from the at least one data source in the portable communicating device;

monitoring, with the processor in the portable communicating device, a progress of the receiving and storing of the transfer of the bulk data in the portable communicating device;

indicating to a user a completion of the receiving and storing of the transfer of the bulk data in the portable communicating device;

communicating directly with a vehicle, using a second communicating device in the portable communicating device, when the portable communicating device is positioned in close proximity to the vehicle to implement high data rate transmission of the bulk data to an onboard data server in the vehicle;\ receiving, with the processor in the portable communicating device, an indication of communication being established with the onboard data server in the vehicle via the second communicating device;

automatically initiating the high data rate transmission of the bulk data to the onboard data server in the vehicle via the second communicating device;

receiving, with the processor in the portable communicating device, an indication regarding available data stored in the onboard data server in the vehicle to be downloaded to the portable communicating device;

automatically initiating, with the processor in the portable communicating device, high data rate reception of the available data from the onboard data server in the vehicle via the second communicating device; and directing, with the processor in the portable communicating device, storage of the available data received from the onboard server in the data storage device.

12. The method of claim 11, the input to initiate the transfer of the bulk data being based on one of (1) a schedule established by the at least one data source, (2) a request from the vehicle, and (3) a manual user input via a user interface associated with the portable communicating device.

13. The method of claim 11, the enabled secure data exchange protocol being according to a public key infrastructure.

14. The method of claim 11, wherein:

the portable communicating device integrally houses at least the second communicating device, a data storage device for storing the bulk data and the processor, and a separate support device in a form of a docking station integrally houses at least the first communicating device and the data security device, the separate support device being located remotely from any vehicle;

the method further comprising:

locally communicatively connecting the portable communicating device to the separate support device for the transfer of the bulk data and storage of the bulk data in the data storage device;

operatively decoupling the portable communicating device from the separate support device for transport of the portable communicating device to a vicinity of the vehicle for the communicating directly with the vehicle.

15. The method of claim 11, the second communicating device communicating directly with the vehicle via a wired communication connection between the second communicating device and the vehicle.

16. The method of claim 11, the plurality of available communication links including (1) at least one communication link operating according to an AeroMACS standard, and (2) at least one communication link configured to establish a satellite communication connection.

17. The method of claim 11, the at least one data source being a content provider for one of in-flight entertainment bulk data or electronic flight bag bulk data.

18. A non-transitory data storage medium storing instructions that, when executed by a processor, cause the processor to execute the steps of a method for providing bulk data delivery to a vehicle, comprising:

receiving an input to initiate a transfer of bulk data from at least one data source to a portable communicating device;

automatically selecting a transfer communication link for a first communicating device from among a plurality of communication links available for selection in the first communicating device;

enabling a secure data exchange protocol for the transfer of the bulk data from the at least one data source to the portable communicating device over the selected transfer communication link;

receiving and securely storing the transfer of the bulk data from the at least one data source in the portable communicating device;

monitoring a progress of the receiving and storing of the transfer of the bulk data in the portable communicating device;

indicating to a user a completion of the receiving and storing of the transfer of the bulk data in the portable communicating device;

communicating directly with a vehicle, using a second communicating device in the portable communicating device, when the portable communicating device is in close proximity to the vehicle to implement high data rate transmission of the bulk data to an onboard data server in the vehicle;

receiving an indication of communication being established with the onboard data server in the vehicle via the second communicating device;

automatically initiating the high data rate transmission of the bulk data to the onboard data server in the vehicle via the second communicating device;

receiving an indication regarding available data stored in the onboard data server in the vehicle to be downloaded to the portable communicating device;

automatically initiating high data rate reception of the available data from the onboard data server in the vehicle via the second communicating device; and directing storage of the available data received from the onboard server in the data storage device.

* * * * *